(12) United States Patent
Bhat (10) Patent No.: US 11,608,187 B2
(45) Date of Patent: Mar. 21, 2023

(54) SINGLE ARM FAILURE REDUNDANCY IN A MULTI-ROTOR AERIAL VEHICLE WITH LEAST ROTORS/PROPELLERS

(71) Applicant: IDEAFORGE TECHNOLOGY PVT. LTD, Navi Mumbai (IN)

(72) Inventor: Ashish Bhat, Navi Mumbai (IN)

(73) Assignee: IDEAFORGE TECHNOLOGY PVT. LTD, Navi Mumbai (IN)

( * ) Notice: Subject to any disclaimer, the term of this patent is extended or adjusted under 35 U.S.C. 154(b) by 498 days.

(21) Appl. No.: 16/636,394

(22) PCT Filed: Jul. 27, 2018

(86) PCT No.: PCT/IB2018/055627
§ 371 (c)(1),
(2) Date: Feb. 4, 2020

(87) PCT Pub. No.: WO2019/025918
PCT Pub. Date: Feb. 7, 2019

(65) Prior Publication Data
US 2020/0172257 A1   Jun. 4, 2020

(30) Foreign Application Priority Data
Aug. 4, 2017 (IN) .............................. 201721027847

(51) Int. Cl.
*B64D 31/10* (2006.01)
*B64C 11/48* (2006.01)
*B64C 39/02* (2023.01)

(52) U.S. Cl.
CPC .............. *B64D 31/10* (2013.01); *B64C 11/48* (2013.01); *B64C 39/024* (2013.01);
(Continued)

(58) Field of Classification Search
None
See application file for complete search history.

(56) References Cited

U.S. PATENT DOCUMENTS

| 2,996,269 | A | 8/1961 | Bolton |
| 2016/0159472 | A1 | 6/2016 | Chan et al. |
| 2019/0256191 | A1* | 8/2019 | Suzuki ................... B64C 39/02 |

FOREIGN PATENT DOCUMENTS

WO      WO2017098412 A1    6/2017

* cited by examiner

*Primary Examiner* — Juan G Flores
(74) *Attorney, Agent, or Firm* — Taft Stettinius & Hollister LLP (57) ABSTRACT

A multi-rotor Aerial Vehicle with least rotors/propellers and having single arm failure redundancy is disclosed. The AV comprises at least five arms with at least one arm having a co-axial pair of contra rotating rotors/propellers. To maintain yaw stability under normal conditions, half of rotors/propellers are rotated in one direction and other half in opposite direction. In the event of failure of any one of the rotors/propellers located adjacent to the pair of contra rotating rotors/propellers, the one propeller/rotor out of the contra rotating rotor/propeller that is rotating opposite to the failed rotor/propeller is shut off. In the event of failure of a rotor/propeller belonging to contra rotating rotors/propellers, other rotor/propeller of the pair is shut off. In the event of failure of any one of rotors/propellers not adjacent to contra rotating rotors/propellers, the RPMs of other rotors/propellers is adjusted to maintain stability and navigate the Aerial Vehicle.

11 Claims, 4 Drawing Sheets

(52) U.S. Cl.
CPC .. *B64C 2201/027* (2013.01); *B64C 2201/108* (2013.01); *B64C 2201/141* (2013.01)

SINGLE ARM FAILURE REDUNDANCY IN A MULTI-ROTOR AERIAL VEHICLE WITH LEAST ROTORS/PROPELLERS

This application is a national phase entry of PCT/IB2018/055627 filed on Jul. 27, 2018 which claims the benefit of Indian Application No. 201721027847 filed Aug. 4, 2017. The disclosures of which are hereby incorporated herein in their entirety.

TECHNICAL FIELD

The present disclosures relates to the field of Aerial Vehicles. More particularly, the present disclosures relates to a multi-rotor Aerial Vehicle with least rotors/propellers that can maintain stable flight even if one of its rotors/propellers and/or associated components fail for any reason.

BACKGROUND

Background description includes information that may be useful in understanding the present invention. It is not an admission that any of the information provided herein is prior art or relevant to the presently claimed invention, or that any publication specifically or implicitly referenced is prior art.

An Unmanned Aerial Vehicle (UAV) is a remotely piloted or self-piloted aircraft that can carry cameras, sensors, communications equipment, or other payloads, is capable of controlled, sustained, level flight, and is usually powered by an engine. A self-piloted UAV may fly autonomously based on pre-programmed flight plans.

UAV's are increasingly being used in various applications, where manned aerial vehicles are not appropriate or feasible. These applications may include military operations, such as surveillance, reconnaissance, target acquisition, data acquisition, communications relay, decoy, harassment, or supply flights. UAVs are also used for a growing number of civilian missions where a human observer would be at risk, such as fire fighting, natural disaster reconnaissance, police observation of civil disturbances or crime scenes, and scientific research. An example of the latter would be observation of weather formations or of a volcano. As miniaturization technology has improved, it is now possible to manufacture very small UAVs (sometimes referred to as micro-aerial vehicles, or MAVs).

UAVs are designed essentially in two forms: fixed-wing aircraft that operate like airplanes, and multi-copters having multiple rotors to provide lift forces and movements in different directions that can take off vertically and can hover like helicopters. The latter design is gaining rapid popularity amongst hobbyists as well as business users and is also sometimes referred to as a "drone".

Multi-rotor UAVs are provided with multiple rotors driven by respective motors that can be controlled in a differentiated manner so as to pilot the drone in altitude, direction and speed.

Multi-rotor UAVs generally have a plurality of symmetrically distributed rotors. Quadcopters (multi-rotor UAVs with four arms, each with one rotor) have advantage of being mechanically simpler than tricopters (multi-rotor UAVs with three arms, each with one rotor), with greater lift capacity and stability. However, they cannot be reconfigured if one of the rotors fails and are completely destabilized due to their inherent dependence on the symmetry of the lift. Therefore, at least five arms are required to maintain stability in event of failure of one arm (referred to as single arm redundancy). Hexarotors and octarotors have increased reliability due to more number of actuators, however the cost and size consideration makes it desirable to reduce the number of arms to a minimum possible configuration.

Figure 1:
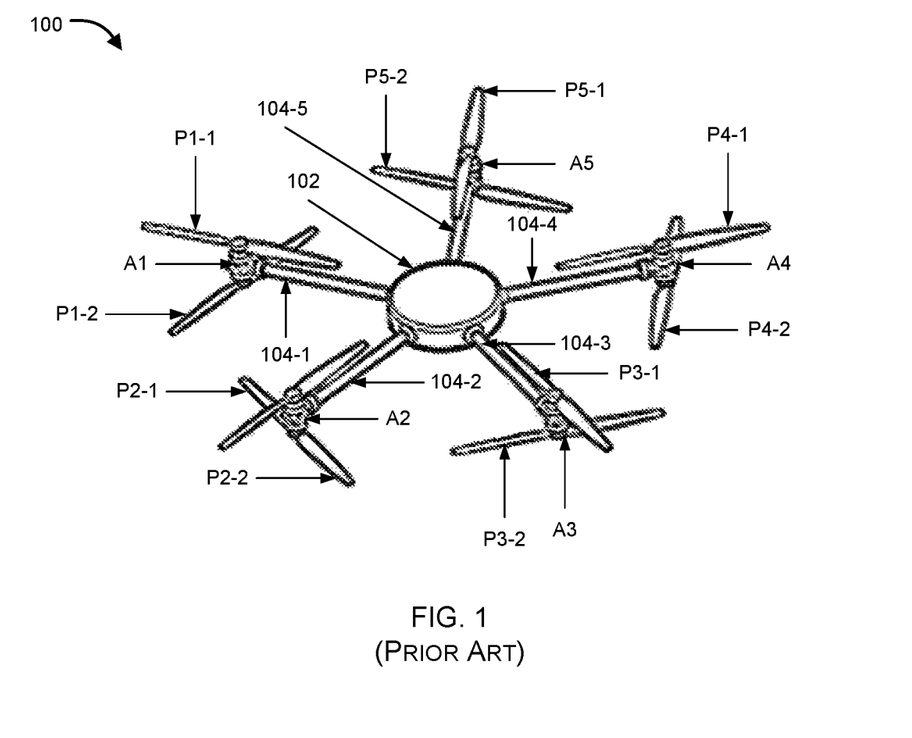
FIG. 1 illustrates a conventional multi-rotor Unmanned Aerial Vehicles (UAV) with each arm fitted with a pair of contra rotating propellers and providing single arm redundancy with minimum number of arms.

FIG. 1 illustrates an exemplary representation of a conventional multi-rotor Unmanned Aerial Vehicle (UAV) 100 with least arms providing single arm redundancy. As stated earlier single arm redundancy in an Aerial vehicle requires at least five arms such as in UAV 100 shown in FIG. 1 having five arms each of which is fitted with a rotor assembly shown as A1, A2, A3, A4 and A5. Each rotor assembly is having a pair of coaxial propellers shown as P1-1 and P1-2 for rotor assembly A1, P2-1 and P2-2 for rotor assembly A2, P3-1 and P3-2 for rotor assembly A3, P4-1 and P4-2 for rotor assembly A4 and P5-1 and P5-2 for rotor assembly A5.

In the event of failure for any reason of one propeller of a rotor assembly mounted on any arm, autopilot of UAV 100 switches off motor corresponding to that rotor assembly so as to as well stop other coaxially placed propeller on that rotor, effectively disabling that arm of the UAV and serving to balance the yaw component. Remaining functional arm are able to provide operational stability to the UAV as its CG lies within polygon formed by the remaining functional arms.

However, the conventional configuration for single arm redundancy requires at least ten propellers and thus does not provide most economical solution for single arm redundancy.

Therefore, there is a need in the art for a stable UAV arrangement for a multi-rotor UAV with minimum number of propellers that would be able to function and maintain flight in the event of failure of one arm and/or associated components, while still maintaining compactness and size considerations.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

A general object of the present disclosure is to provide a reliable and cost effective multi-rotor rigid frame Aerial Vehicle.

An object of the present disclosure is to provide a multi-rotor Aerial Vehicle with inbuilt single arm failure redundancy to improve its reliability.

Another object of the present disclosure is to provide single arm failure redundancy in a multi-rotor Aerial Vehicle keeping number of rotors to a minimum.

Yet another object of the present disclosure is to provide in built single arm failure redundancy that takes care of lift, yaw, pitch and roll requirements of the multi-propeller UAV.

SUMMARY

Aspects of the present disclosure relate to multi rotor rigid frame Aerial Vehicle (AV). The disclosure provides a system for providing single arm failure redundancy, wherein in the event of failure of one of its arm/rotor, the AV does not lose stability. In an aspect, the disclosure provides a configuration that requires minimum number of rotors/propellers thus providing single arm failure redundancy at least cost.

Embodiments of the present disclosure provide a rigid frame AV having 5-arms with centre of gravity lying around centre point of polygon made by joining adjacent propellers in a fixed configuration. Thus, in the event of failure of any one arm, the CG of the AV still lies well within the minimum support polygon formed by the remaining four arms still functioning, thus providing capability of maintaining stability and yaw control even in the event of failure of one arm of AV.

In an aspect, it is possible to achieve objectives of the present disclosure with any other odd number of arms that is more than five, and therefore variations having more than five arms are well within the scope of the present disclosure.

In that respect, the present disclosure provides a system for achieving single arm failure redundancy with least number of propellers/rotors for a configuration having a given number of arms.

In an aspect, polygon defined by lines joining adjacent propellers can be a regular polygon with CG of UAV lying close to centre of the polygon. Therefore, in event of failure of any one arm, the CG of UAV still lies well within the minimum support polygon formed by the remaining arms that are still functioning, thus providing capability of maintaining stability and yaw control even in the event of failure of one arm of UAV.

In an alternate embodiment, the polygon defined by lines joining adjacent propellers can be an irregular convex polygon of a configuration such that in event of failure of any one arm, the CG of UAV still lies well within the minimum support polygon formed by the remaining arms that are still functioning thus providing capability of maintaining stability and yaw control even in the event of failure of one arm of UAV.

In an aspect, at least one arm of the AV can incorporate a pair of coaxial contra rotating propellers with remaining arms having a single propeller, and the coaxial contra rotating propellers can have individual motors to enable their independent operation. In another aspect, under normal conditions half of these propellers can be configured to rotate in one direction and other half in opposite direction so as to provide yaw stability. In yet another aspect, single propellers configured on adjacent arms may be configured to rotate in opposite direction.

In an aspect of the present disclosure, the at least one pair of coaxial pair is used to compensate unequal torque and thrust product that occurs when a rotor fails mid-air, thereby maintaining stability of the AV and enabling completion of the assigned mission.

In an embodiment, in the event of mid-flight failure of any one of the rotors/propellers that is other than out of pair of contra rotating pair, but located adjacent to the contra rotating pair of propellers, one of the propellers out of pair of contra rotating rotors that is rotating in direction opposite to the failed rotor/propeller can be shut off such that the UAV is reconfigured to a quadcopter and works accordingly.

In an embodiment, if the failed rotor/propeller is one out of pair of contra rotating rotors/propellers, the functional contra rotating rotor/propeller can be shut off to maintain yaw stability. Thus, in this condition also four out of five arms shall continue to have functioning propellers to make the AV configuration similar to a typical quadcopter and works accordingly.

In an embodiment, in the event of mid-flight failure of any one of the rotors/propellers that is other than out of pair of contra rotating pair, and is not located adjacent to the contra rotating pair of propellers, the AV will only be partially redundant in all axis. The UAV is capable of controlled pitch in both positive and negative directions but have controlled yaw only in one direction either positive or negative about axis perpendicular to failed rotor depending on configuration. However, it will be capable of maintaining the mission with complete control in the axis along the failed rotor direction by adjusting the RPMs of the remaining rotors. In this case, RPMs of the rotors/propellers adjacent to the failed propeller (and both rotating in direction opposite to the failed propeller) shall be reduced, and RPMs of propeller out of pair of contra rotating propellers and another propeller on its adjacent arm that are rotating in same direction as the failed propeller shall be increased. Simultaneously, RPMs of the contra rotating propellers shall be adjusted such that the net torque about the body frame of the AV is zero. In an embodiment, movement of the AV in a direction other than direction of the failed rotor/propeller can be enabled by making appropriate yaw movement and then proceeding as movement of the AV in any other direction with fixed yaw would not be possible as that shall make the net torque non-zero.

In an embodiment, if total number of propellers is an odd number (which is possible in case an even number of arms such as two arms, incorporate pairs of coaxial contra rotating propellers), one of the propellers of the pair of contra rotating propellers can be kept off under normal conditions so as to meet limitations of the configuration described above, i.e. having even number of functional rotors under normal condition—half of them rotating in one direction and other half in opposite direction thus providing yaw stability. Principles underlying the present disclosure can still be applied to maintain stability of the AV with additional benefit that the propeller that is kept off is under normal condition can be made operational in certain conditions. Besides, the contra rotating propellers can be positioned judiciously so that more arms that have a single propeller are adjacent to an arm having a pair of contra rotating propellers.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

The term 'yaw' as used herein refers to aside to side movement of the nose or rotation or heading of a multi-rotor UAV about its vertical axis passing through its centre of gravity The term 'lift force' as used herein refers to various forces in an UAV enabling it to be lifted up.

The term 'centre of lift' as used herein refers to the point on an UAV where sum total of all lift forces generated by all rotors can be represented as an aggregate force with its direction.

The term 'throttle' as used herein refers to a mechanism to vary the lift forces of a UAV, generally by varying speed of its rotor assemblies that drives its propellers.

The term 'moment of force' as used herein refers to the tendency of a force to rotate an object about an axis, fulcrum, or pivot.

Embodiments explained herein relate to a rigid frame multi-rotor aerial vehicle that provides single arm redundancy with least number of rotors. Thus the disclosure provides most economical configuration for an Aerial Vehicle which can operate even if one of its rotor assembly and/or associated components fail for any reason.

It is to be appreciated that though various embodiments of the present disclosure have been described with reference to five armed configuration with one arm having a pair of contra rotating propellers, embodiments of the present disclosure can be applied to other configurations as well, such as to AVs having more than five but odd numbered arms, and with those having more than one arm with pairs of contra rotating propellers, as would be explained in subsequent paragraphs, and all such variations departing from the embodiments explained in the present disclosure are well within the scope of the present disclosure without any limitations. In that respect, the present disclosure provides a system for achieving single arm failure redundancy with least number of propellers/rotors for a configuration having a given number of arms.

Figure 2:
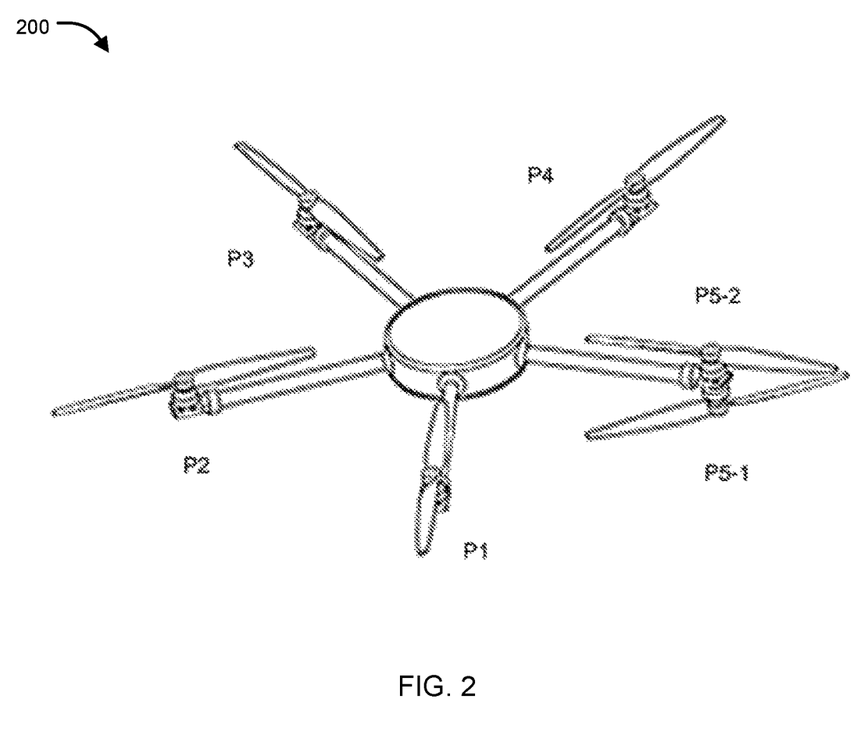
FIG. 2 illustrates an exemplary perspective view of a five armed UAV with six propellers to get single arm redundancy with least number of rotors/propellers in accordance with an embodiment of the present disclosure.

FIG. 2 illustrates an exemplary perspective view of a fixed/rigid frame five armed UAV 200 with six propellers to get single arm redundancy in accordance with an embodiment of the present disclosure. As shown the UAV 200 incorporates six rotors/propellers with one arm having a pair of contra rotating propellers, and other four arms having single propellers/rotors. In an aspect, feature of single arm redundancy can be achieved in a five armed UAV even with number of propellers less than ten as was the case with conventional arrangement as shown in FIG. 1, and reduction of number of rotors can have a significant impact on cost.

In an embodiment, the five armed UAV 200 can comprise four rotors each having a single propeller such as P1, P2, P3 and P4, and a coaxial set of propellers P5-1 and P5-2 on its fifth arm as shown in FIG. 2. The four arms can have propellers P1 to P4 arranged to rotate in clockwise and counter-clockwise direction alternately to maintain yaw stability under normal conditions. The co-axial propeller pair can comprise two contra rotating propellers. Thus the UAV 200 can have only six propellers, three out of these six can rotate in one direction and other three rotate in opposite direction giving overall yaw stability. As can be appreciated, reduction in number of propellers from ten to six can bring in considerable cost benefits.

In an aspect, coaxial set of contra-rotating propellers P5-1 and P5-2 can have independent motors so as to enable their independent operation.

In an aspect, the UAV 200 can further include a control system that incorporates an auto pilot configured to control operation of the rotors including their throttle based on operating condition of the UAV 200 and its functional systems. For example, the auto pilot can start or stop rotation of a rotor, and throttle up or throttle down different rotors to maintain tilt stability, increase/decrease altitude or maintain yaw stability of the Aerial Vehicle.

In an aspect, the system of the disclosed UAV 200 can also comprise means to detect location of a failed arm/propeller/rotor, and based on the detected location, the autopilot can stop and or stop one or more of other rotors, throttle up or throttle down other rotors based on their relative vector position in relation with the failed rotor to maintain stability of the AV.

Figure 3:
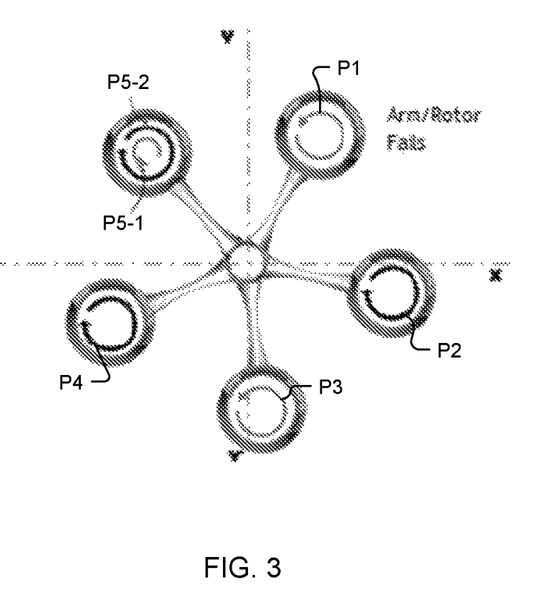
FIG. 3 illustrates an exemplary representation of a five armed UAV with propeller on an arm adjacent to arm having pair of contra rotating propellers failing in accordance with an embodiment of the present disclosure.

In an embodiment of implementation for maintaining stability of the disclosed UAV 200, referring to FIG. 3, in the event of mid-flight failure of any one of the rotors/propellers out of P1 and P4, i.e. those located adjacent to the contra rotating pair of propellers i.e. P5-1 and P5-2, one of the propellers out of pair of contra rotating propellers i.e. P5-1 or P5-2, that is rotating in direction opposite to the failed rotor/propeller can be shut off In such a scenario the UAV 200 would get reconfigured as a quadcopter and work accordingly to maintain stability.

In another embodiment of implementation for maintaining stability of the disclosed UAV 200, if the failed rotor/propeller is one out of pair of contra rotating rotors/propellers i.e. P5-1 or P5-2, the functional contra rotating rotor/propeller can be shut off to maintain yaw stability. Thus, in this condition also four out of five arms shall continue to have functioning propellers to make the AV configuration similar to a typical quadcopter and works accordingly.

Figure 4:
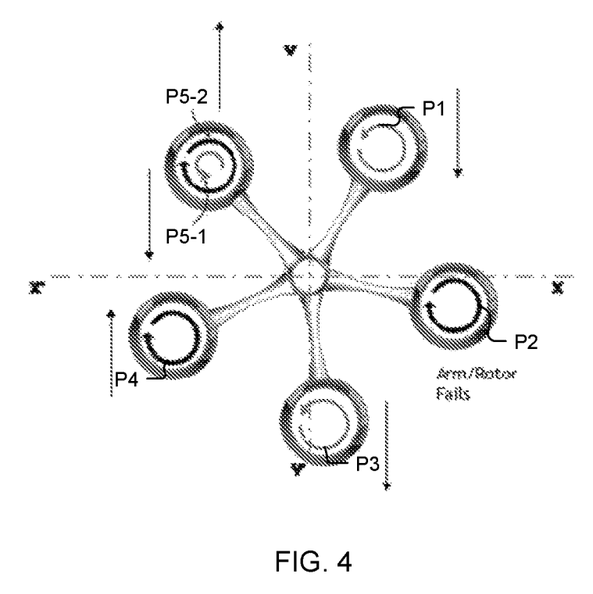
FIG. 4 illustrates an exemplary perspective view of a five armed UAV with propeller on an arm non adjacent to arm having pair of contra rotating propellers failing in accordance with an embodiment of the present disclosure.

In yet another embodiment of implementation for maintaining stability of the disclosed UAV 200, referring to FIG. 4, in the event of mid-flight failure of any one of the rotors/propellers such as P-2 or P-3 that is not located adjacent to the contra rotating pair of propellers, one of the contra rotating propellers i.e. P5-1 or P5-2 cannot be shut down. Though shutting down P5-1 or P5-2 can result in immediate yaw stability, it will result in problem in navigating the UAV 200. Therefore, it is proposed not to shut one of the pair of contra rotating propellers, and maintain yaw stability by reducing RPMs of the rotors/propellers adjacent to the failed propeller i.e. P2 and P4 in case of failure of P3 or P1 and P3 in case of failure of P2. Since both of such propellers/rotors are rotating in direction opposite to the failed propeller, reducing their RPM can result in compensating torque of failed propeller/rotor and thereby contribute to yaw stability. Simultaneously, for same reason, RPMs of a propeller out of pair of contra rotating propellers and another propeller on its adjacent arm, that are rotating in same direction as the failed propeller(i.e. P5-1 and P1 in case of failure of P2; or P5-2 and P4 in case of failure of P3) can be increased. In addition, RPMs of the contra rotating propellers can be adjusted such that the net torque about the body frame of the AV is zero. These actions can result in establishing yaw stability after mid-air failure of a rotor/propeller such as P2 or P3. In addition, adjustment of RPMs of the contra rotating propellers can also be used for yaw movement of the UAV 200 and thereby navigating the UAV 200 in different directions (refer to paragraph below).

Thus, with this configuration after mid-air failure of a rotor/propeller that is not adjacent to the arm having pair of contra rotating propellers, UAV 200 shall be capable of controlled pitch in both positive and negative directions but shall have controlled yaw only in one direction either positive or negative about axis perpendicular to failed rotor depending on configuration of the failed rotor/propeller. Movement of the UAV 200 in any other direction such as direction opposite to the failed rotor/propeller can be enabled by making an appropriate yaw movement such as by 180 degree for movement in opposite direction, and then proceeding. This is because movement of the UAV in any other direction with fixed yaw would not be possible as that shall make the net torque non-zero. Thus, it will be capable of maintaining the assigned mission with complete control in the axis along the failed rotor direction by adjusting the RPMs of the remaining rotors.

In an embodiment, if total number of propellers is an odd number (which is possible in case an even number of arms such as two arms incorporate pairs of coaxial contra rotating propellers), one of the propellers of the pair of contra rotating propellers can be kept off under normal conditions so as to meet limitations of the configuration described above, i.e. having even number of functional rotors under normal condition—half of them rotating in one direction and other half in opposite direction thus providing yaw stability. Principles underlying the present disclosure can still be applied to maintain stability of the AV with additional benefit that the propeller that is kept off under normal condition can be made operational in certain conditions. Besides, the contra rotating propellers can be positioned judiciously so that more arms that have a single propeller are adjacent to an arm having a pair of contra rotating propellers.

It is to be appreciated that while the embodiments of the present disclosure have been explained with fixed pitch propeller mechanism, principle of the disclosure can be implemented with a variable pitch propeller system as well without any limitation whatsoever.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed arrangements described above.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a reliable and cost effective multi-rotor rigid frame Aerial Vehicle.

The present disclosure provides a multi-rotor Aerial Vehicle with in built single arm failure redundancy so as to improve its reliability.

The present disclosure provides single arm failure redundancy in a multi-rotor Aerial Vehicle keeping number of rotors to a minimum.

The present disclosure provides inbuilt single arm failure redundancy that takes care of lift, yaw, pitch and roll requirements of the multi-propeller UAV.

I claim:

1. A multi-rotor Aerial Vehicle comprising:
a frame having at least five arms, wherein total number of arms is an odd number;
a plurality of rotors/propellers configured on the at least five arms; wherein at least-one arm, but not all arms out of the at least five arms incorporates a co-axial pair of contra rotating rotors/propellers;
a control system incorporating an autopilot configured to control operation of the plurality of rotors/propellers including throttle of the plurality of rotors/propellers based on operating condition of the Aerial Vehicle and functional systems of the Aerial Vehicle to maintain yaw stability, lift stability and tilt stability;
wherein, in the event of failure of any one of the plurality of rotors/propellers, the autopilot controls operation the plurality of rotors/propellers to maintain yaw stability, lift stability and tilt stability.

2. The Aerial Vehicle of claim 1, wherein the rotors/propellers are configured such that lines joining the adjacent rotors/propellers define an irregular convex polygon of a configuration such that in event of failure of any one arm, centre of gravity of the Aerial Vehicle still lies within a polygon formed by remaining arms that are functional.

3. The Aerial Vehicle of claim 1, wherein the co-axial pair of contra rotating rotors/propellers have individual motors to enable independent operation of the contra rotating rotors/propellers.

4. The Aerial Vehicle of claim 1, wherein to maintain yaw stability under normal conditions, half of the plurality of rotors/propellers are configured to rotate in one direction and other half are configured for rotation in opposite direction.

5. The Aerial Vehicle of claim 4, wherein to maintain yaw stability under normal conditions when total of the plurality of rotors/propellers is an odd number, an appropriate propeller/rotor out of a co-axial pair of contra rotating rotors/propellers is kept off to have equal numbers rotating in two opposite directions.

6. The Aerial Vehicle of claim 1, wherein, in the event of failure of any one of the plurality of rotors/propellers on an arm located adjacent to the at least one arm having the co-axial pair of contra rotating rotors/propellers, the auto pilot shuts one propeller/rotor out of the pair of contra rotating rotor/propeller that has direction of rotation opposite to direction of rotation of the failed rotor/propeller to maintain yaw stability.

7. The Aerial Vehicle of claim 1, wherein in the event of failure of any one of the rotor/propeller belonging to the co-axial pair of contra rotating rotors/propellers, other rotor/propeller of the pair is shut off to maintain yaw stability.

8. The Aerial Vehicle of claim 1, wherein, in the event of failure of any one of the plurality of rotors/propellers on an arm that is not adjacent to the at least one arm having the co-axial pair of contra rotating rotors/propellers, the auto pilot reduces RPMs of the rotors/propellers adjacent to the failed propeller.

9. The Aerial Vehicle of claim 8, wherein, in the event of failure of any one of the plurality of rotors/propellers on an arm that is not adjacent to the at least one arm having the co-axial pair of contra rotating rotors/propellers, the auto pilot increases RPMs of propeller out of pair of contra rotating propellers and another propeller on an arm adjacent to the pair of contra rotating propellers that are rotating in same direction as the failed propeller.

10. The Aerial Vehicle of claim 9, wherein, in the event of failure of any one of the plurality of rotors/propellers on an arm that is not adjacent to the at least one arm having the co-axial pair of contra rotating rotors/propellers, the auto pilot adjusts RPMs of the contra rotating propellers such that the net torque about the body frame of the Aerial Vehicle is zero.

11. The Aerial Vehicle of claim 10, wherein in the event of failure of any one of the plurality of rotors/propellers on an arm that is not adjacent to the at least one arm having the co-axial pair of contra rotating rotors/propellers, movement of the Aerial Vehicle in any direction other than direction of the failed rotor/propeller, is enabled by making an appropriate yaw movement.

* * * * *